US010402157B2

(12) United States Patent
Gan et al.

(10) Patent No.: US 10,402,157 B2
(45) Date of Patent: Sep. 3, 2019

(54) VOLUME PROCESSING METHOD AND DEVICE AND STORAGE MEDIUM

(71) Applicant: GUANGDONG OPPO MOBILE TELECOMMUNICATIONS CORP., LTD., Dongguan (CN)

(72) Inventors: Gaoting Gan, Dongguan (CN); Yajun Li, Dongguan (CN); Guang Tu, Dongguan (CN); Hai Yang, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 0 days.

(21) Appl. No.: 16/118,076

(22) Filed: Aug. 30, 2018

(65) Prior Publication Data
US 2018/0373490 A1    Dec. 27, 2018

Related U.S. Application Data

(63) Continuation of application No. PCT/CN2017/088717, filed on Jun. 16, 2017.

(30) Foreign Application Priority Data

Jun. 16, 2016 (CN) .......................... 2016 1 0429196

(51) Int. Cl.
*H04R 5/04* (2006.01)
*G06F 3/16* (2006.01)
*H04M 1/725* (2006.01)

(52) U.S. Cl.
CPC .............. *G06F 3/165* (2013.01); *G06F 3/162* (2013.01); *H04M 1/725* (2013.01); *H04R 5/04* (2013.01)

(58) Field of Classification Search
CPC ............. G06F 3/16; H04M 1/725; H04R 5/04
(Continued)

(56) References Cited

U.S. PATENT DOCUMENTS

2007/0206820 A1    9/2007 Ikawa
2009/0143054 A1    6/2009 Drescher
(Continued)

FOREIGN PATENT DOCUMENTS

CN    102752687 A  * 10/2012  ............... H04R 3/04
CN    102752687 A    10/2012
(Continued)

OTHER PUBLICATIONS

English Translation of International Search Report in international application No. PCT/CN2017/088717, dated Aug. 8, 2017.
(Continued)

*Primary Examiner* — Melur Ramakrishnaiah
(74) *Attorney, Agent, or Firm* — Ladas & Parry, LLP (57) ABSTRACT

Disclosed are a volume processing method and a user terminal. In the method, an initial volume output value of an audio file is recorded as a first output value, the volume output value of the audio file is decreased to a second output value in advance before a parameter of sound effect is configured to the audio file, and the volume output value is adjusted from the second output value to the first output value step by step according to a volume increasing model after the parameter of sound effect is configured.

15 Claims, 4 Drawing Sheets

(58) Field of Classification Search
USPC ...... 381/107, 56, 123, 104; 700/94; 704/270
See application file for complete search history.

(56) References Cited

U.S. PATENT DOCUMENTS

| | | |
|---|---|---|
| 2014/0086427 A1 | 3/2014 | Yamkovoy |
| 2014/0156046 A1* | 6/2014 | Cameron ......... G11B 20/10527 700/94 |
| 2015/0117676 A1 | 4/2015 | Li |

FOREIGN PATENT DOCUMENTS

| | | | |
|---|---|---|---|
| CN | 103458114 A | * | 12/2013 |
| CN | 103458114 A | | 12/2013 |
| CN | 103618514 A | | 3/2014 |
| CN | 104281432 A | | 1/2015 |
| CN | 105635916 A | | 6/2016 |
| CN | 105933537 A | | 9/2016 |

OTHER PUBLICATIONS

Written Opinion of the International Search Authority in international application No. PCT/CN2017/088717, dated Aug. 8, 2017.
Office Action mailed for corresponding Chinese Application No. 201610429196.5 dated Dec. 13, 2018. Machine translation provided by Google Translate.
Supplementary European Search Report in the European application No. 17812764.3, mailed on Mar. 29, 2019.

* cited by examiner

VOLUME PROCESSING METHOD AND DEVICE AND STORAGE MEDIUM

CROSS-REFERENCE TO RELATED APPLICATION

This is a continuation application of PCT Application No. PCT/CN2017/088717 filed on Jun. 16, 2017, which claims a priority from a Chinese Patent Application No.: 201610429196.5, the contents of all of which are hereby incorporated by reference in their entireties.

TECHNICAL FIELD

The disclosure relates to the technical field of user terminals, and particularly to a volume processing method and device and storage medium.

BACKGROUND

At present, a user terminal may realize various functions, for example, recording an audio/video file or downloading an audio/video file from an application. Moreover, a sound effect may be configured to an audio/video file in the user terminal to enrich an expression effect of the audio/video file. Here, a video file may include an audio file and an image file. The audio file corresponds to the image file on the basis of a time point. Therefore, in a process of adding the sound effect to the audio/video file, the sound effect is configured to the audio file. However, in this process, a sound in the original audio file may usually be suddenly changed. For example, a volume is suddenly increased, so that noise may be easily produced to bring auditory discomfort to a user and reduce a user experience.

SUMMARY

Embodiments of the disclosure provide a volume processing method and device and storage medium.

According to a first aspect, the embodiments of the disclosure provide a volume processing method, which may include that: an initial volume output value of an audio file is recorded as a first output value; before a parameter of sound effect is configured to the audio file, the volume output value of the audio file is decreased to a second output value in advance; and after the parameter of sound effect is configured, the volume output value is regulated from the second output value to the first output value step by step according to a volume increasing model.

According to a second aspect, the embodiments of the disclosure provide a volume processing device, wherein this user terminal includes functional units, and the functional units are configured to execute part or all of the operations described in any method according to the first aspect of the embodiments of the disclosure.

According to a third aspect, the embodiments of the disclosure provide a user terminal, which may include: a processor, a memory, a communication interface and a communication bus, wherein the processor, the memory and the communication interface may be connected through the communication bus and complete mutual communication; the memory may store an executable program code, and the communication interface may be configured for wireless communication; and the processor may be configured to call the executable program code in the memory to execute part or all of the operations described in any method according to the first aspect of the embodiments of the disclosure.

According to a fourth aspect, the embodiments of the disclosure provide a non-transitory computer-readable storage medium having stored thereon instructions that when being executed by a computer, cause the computer to perform a method for processing volume, the method including: recording an initial volume output value of an audio file as a first output value; when a sound effect parameter is required to be added to the audio file, decreasing a volume output value of the audio file to a second output value in advance; and after the sound effect parameter is added, regulating the volume output value from the second output value to the first output value step by step according to a volume increasing model.

BRIEF DESCRIPTION OF DRAWINGS

In order to describe the technical solutions in the embodiments of the disclosure more clearly, the drawings required to be used in descriptions about the embodiments will be briefly introduced below.

DETAILED DESCRIPTION

In order to make the solutions of the disclosure better understood by those skilled in the art, the technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted not to describe a specific sequence but to distinguish similar objects. In addition, terms "include" and "have" and any transformation thereof are intended to cover nonexclusive inclusions. For example, a process, method, system, product or equipment including a series of operations or units is not limited to the operations or units which are listed, but may optionally further include operations or units which are not listed or optionally further include other operations or units intrinsic to the process, the method, the product or the equipment.

"Embodiment" mentioned in the disclosure means that a specific characteristic, structure or property described in combination with the embodiment may be included in at least one embodiment of the disclosure. Appearance of this phrase at each position in the specification may not always refer to the same embodiment as well as an independent or alternative embodiment mutually exclusive with the other embodiments. Those skilled in the art explicitly and implicitly understand that the embodiments described in the disclosure may be combined with the other embodiments.

The method embodiment of the disclosure will be described below.

Figure 1:
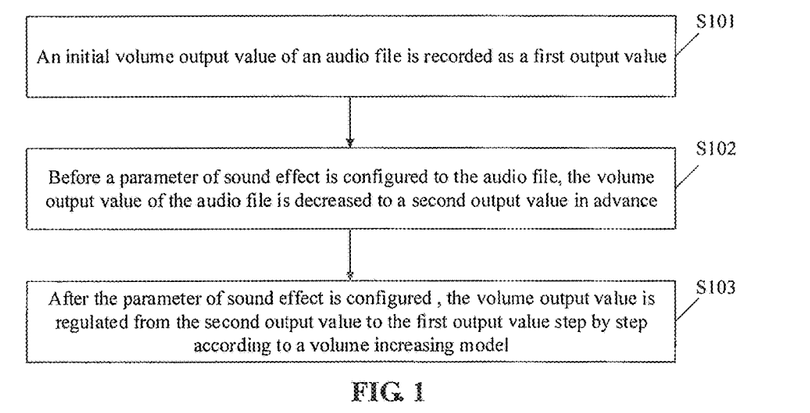
FIG. 1 is a flowchart of a method for processing volume according to an embodiment of the disclosure.

Referring to FIG. 1, FIG. 1 is a flowchart of a method for processing volume according to an embodiment of the disclosure. The method may be implemented by a user terminal described in the device embodiment. As shown in FIG. 1, the method may include the following operations.

In S101, an initial volume output value of an audio file is recorded as a first output value.

In an embodiment, when a sound effect is required to be configured to the audio file, the initial volume output value of the audio file may be recorded as the first output value. Specifically, when the audio file, to which the sound effect is required to be configured, of the user terminal is opened or the audio file is presently played in the user terminal, if an operation of adding the sound effect to the audio file is detected, the initial volume output value of the audio file may be recorded, and the initial volume output value of the audio file is taken as the first output value.

In S102, before a parameter of sound effect is configured to the audio file, the volume output value of the audio file is decreased to a second output value in advance.

In an embodiment, before the parameter of sound effect is configured to the audio file, the volume output value of the audio file may be decreased to the second output value in advance. Specifically, before the parameter of sound effect is required to be configured to the audio file, the volume output value of the audio file may be decreased in advance to avoid influence of an excessively high volume output value caused by sudden addition of the sound effect on auditory comfort of a user. Here, the volume output value of the audio file is decreased to the second output value. The second output value may be a minimum output value. For example, the minimum output value is 0. Alternatively, the second output value may be determined on the basis of a preset volume increasing model. Alternatively, the second output value may be determined on the basis of a sound effect intensity of the parameter of sound effect presently required to be configured. When the sound effect intensity of the parameter of sound effect required to be configured is high, the second output value is relatively small. When the sound effect intensity of the parameter of sound effect required to be configured is low, the second output value is relatively large. Alternatively, the second output value may be determined on the basis of a preset noise threshold value. After the noise threshold value of the volume output value is preset, the second output value may be determined to be any value smaller than the noise threshold value. Optionally, the noise threshold value may be determined according to an audio type of the audio file or a volume that the user is used to. When the audio type is a rock and roll type, the noise threshold value may be preset to be relatively large. When the audio type is a soft music type, the noise threshold value may be preset to be relatively small. Alternatively, when the user is used to a relatively high volume, the noise threshold value may be preset to be relatively large. When the user is used to a relatively low volume, the noise threshold value may be preset to be relatively small.

In S103, after the parameter of sound effect is configured, the volume output value is regulated from the second output value to the first output value step by step according to a volume increasing model.

In an embodiment, before the parameter of sound effect is configured to the audio file, the volume output value of the audio file may be decreased to the second output value in advance and may be regulated from the second output value to the first output value step by step according to the volume increasing model. That is, the decreased volume output value of the audio file is gradually recovered into the initial volume output value before addition of the parameter of sound effect. Specifically, the volume output value is regulated according to the volume increasing model, the volume increasing model may be a preset volume increasing model, and different volume increasing models may also be determined according to different parameter of sound effects. The volume increasing model may be a corresponding relationship curve between an addition duration of a parameter of sound effect and a volume output value and the like. The corresponding relationship curve may be a linear positive correlation curve or may be an exponential increase curve, a logarithmic increase curve or the like, and there are no limits made in the embodiment of the disclosure. Or the volume increasing model may also be a corresponding relationship curve between a sound effect intensity of a parameter of sound effect and a volume output value. The volume output value of the audio file is gradually increased with gradual increasing of the sound effect intensity of the parameter of sound effect. It is to be noted that, in the embodiment of the disclosure, the volume output value is not limited to be recovered into the first output value during acting of the parameter of sound effect on the audio file and the volume output value may be recovered into the first output value within time longer than the addition duration.

In the embodiment of the disclosure, the initial volume output value of the audio file is recorded. When the parameter of sound effect is configured to the audio file, the volume output value of the audio file is decreased in advance. In such a way, influence of an excessively high volume output value caused by addition of the sound effect on the auditory comfort of the user is avoided. Moreover, after the parameter of sound effect is configured, the volume output value may be regulated from the decreased second output value to the first output value step by step according to the volume increasing model to ensure smooth transition of the volume output value of the audio file during addition of the sound effect, improve the auditory comfort of the user and further improve a user experience.

Figure 2:
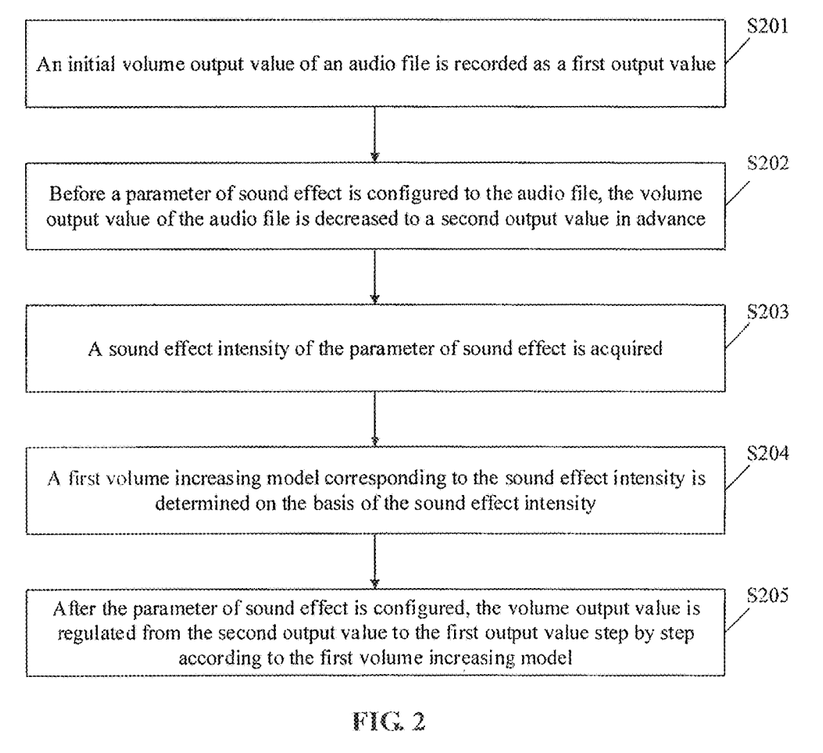
FIG. 2 is a flowchart of another method for processing volume according to an embodiment of the disclosure.

Referring to FIG. 2, FIG. 2 is a flowchart or another method for processing volume according to an embodiment of the disclosure. The method may be implemented by a user terminal described in the device embodiment. As shown in FIG. 2, the method may include the following operations.

In S201, an initial volume output value of an audio file is recorded as a first output value.

In an embodiment, when a sound effect is required to be configured to the audio file, the initial volume output value of the audio file may be recorded as the first output value. Specifically, when the audio file, to which the sound effect is required to be configured, of the user terminal is opened or the audio file is presently played in the user terminal, after an operation of adding the sound effect to the audio file is detected, the initial volume output value of the audio file may be recorded, and the initial volume output value of the audio file is taken as the first output value.

In S202, before a parameter of sound effect is configured to the audio file, the volume output value of the audio file is decreased to a second output value in advance.

In an embodiment, before the parameter of sound effect is configured to the audio file, the volume output value of the audio file may be decreased to the second output value in advance. Specifically, when the parameter of sound effect is required to be configured to the audio file, the volume output value of the audio file may be decreased in advance to avoid influence of an excessively high volume output value caused by addition of the sound effect on auditory comfort of a user. Here, the volume output value of the audio file is decreased to the second output value. The second output value may be a minimum output value. For example, the minimum output value is 0. Alternatively, the second output value may be determined on the basis of a preset volume increasing model. Alternatively, the second output value may be determined on the basis of a sound effect intensity of the parameter of sound effect presently required to be configured. When the sound effect intensity of the parameter of sound effect required to be configured is high, the second output value is relatively small. When the sound effect intensity of the parameter of sound effect required to be configured is low, the second output value is relatively large. Alternatively, the second output value may be determined on the basis of a preset noise threshold value. After the noise threshold value of the volume output value is preset, the second output value may be determined to be any value smaller than the noise threshold value. Optionally, the noise threshold value may be determined according to an audio type of the audio file or a volume the user is used to. When the audio type is a rock and roll type, the noise threshold value may be preset to be relatively large. When the audio type is a soft music type, the noise threshold value may be preset to be relatively small. Alternatively, when the user is used to a relatively high volume, the noise threshold value may be preset to be relatively large. When the user is used to a relatively low volume, the noise threshold value may be preset to be relatively small.

In S203, a sound effect intensity of the parameter of sound effect is acquired.

In an embodiment, the sound effect intensity of the parameter of sound effect may also be acquired at the same time when the parameter of sound effect is configured to the audio file. Specifically, the sound effect intensity of the parameter of sound effect may be acquired to determine a first volume increasing model on the basis of the sound effect intensity. Here, the parameter of sound effect may include multiple parameter of sound effects. Each parameter of sound effect corresponds to a sound effect intensity. The magnitude of each parameter of sound effect may be detected to determine an overall sound effect intensity of the parameter of sound effect to be configured. The weight of each parameter of sound effect may also be determined to determine a proportion of the sound effect intensity corresponding to each parameter of sound effect in the overall sound effect intensity and further determine the sound effect intensity of the parameter of sound effect to be configured. Of course, a first volume increase may further be determined on the basis of the sound effect intensity corresponding to each parameter of sound effect.

In S204, a first volume increasing model corresponding to the sound effect intensity is determined on the basis of the sound effect intensity.

In an embodiment, after the sound effect intensity of the parameter of sound effect is acquired, the first volume increasing model corresponding to the sound effect intensity may further be determined on the basis of the sound effect intensity. Step S204 may be implemented on the basis of the following operations:

N sound effect intensities corresponding to N preset periodic moments are acquired during acting of the parameter of sound effect on the audio file, N being an integer;

N corresponding volume increments are determined on the basis of the N sound effect intensities; and the first volume increasing model is determined on the basis of the N volume increments.

Specifically, the N sound effect intensities may be acquired during acting of the parameter of sound effect on the audio file to the audio file. That is, a mapping relationship is formed between a parameter of sound effect and an addition duration. Each moment of the addition duration corresponds to a parameter of sound effect. The parameter of sound effect may be the same as that of the previous moment or may be different from that of the previous moment. A parameter of sound effect curve is formed. Different parameter of sound effects correspond to different sound effect intensities. An acquisition period may be preset. N parameter of sound effects on the parameter of sound effect curve are acquired. The sound effect intensities of the N parameter of sound effects may further be acquired. Alternatively, after the parameter of sound effect curve is acquired, a sound effect intensity curve of the sound effect intensities relative to the addition duration is acquired according to a corresponding relationship between a parameter of sound effect and a sound effect intensity. That is, different addition moments in the addition duration correspond to the same or different sound effect intensities. The N sound effect intensities on the sound effect intensity curve are further acquired through the preset acquisition period.

After the N sound effect intensities are determined, the N corresponding volume increments may be determined according to the N sound effect intensities. Specifically, a sound effect intensity may form a positive correlation with a volume increasing or form a negative correlation with the volume increasing. When the sound effect intensity forms the positive correlation with the volume increasing, if the sound effect intensity is higher, the volume increasing is larger, so that an output effect of the audio file is further enhanced, and a user experience is improved. Alternatively, when the sound effect intensity forms the negative correlation with the volume increase, if the sound effect intensity is higher, the volume increasing is smaller, an output volume of the audio file is further balanced, and the output volume of the audio file is smoother. The two modes may further be determined on the basis of a type of the audio file or a volume output habit the user is prone to, and there are no limits made herein.

After the N volume increments are determined, the volume increasing model may be established on the basis of the N volume increments. For example, statistics is made to the N volume increments, a curve trend formed by the N volume increments is determined. And a corresponding mathematical curve is further determined on the basis of the N statistical volume increments. The mathematical curve is the volume increasing model.

In S205, after the parameter of sound effect is configured, the volume output value is regulated from the second output value to the first output value step by step according to the first volume increasing model.

In an embodiment, after the parameter of sound effect is configured to the audio file in the abovementioned manner, the volume output value may be regulated from the second output value to the first output value step by step according to the first volume increasing model. When the volume output value is regulated according to a first volume increase mode and, moreover, the volume output value may be regulated and recovered from the second output value to the initial volume output value, i.e., the first output value, of the audio file through the first volume increasing model, not only noise influence caused by volume output increase during addition of the sound effect may be avoided, but also a playing effect of the audio file may be highlighted or volume output of the audio file is smoother.

In the embodiment of the disclosure, the initial volume output value of the audio file is recorded. When the parameter of sound effect is configured to the audio file, the volume output value of the audio file is decreased in advance. As such, influence of an excessively high volume output value caused by addition of the sound effect on the auditory comfort of the user is avoided. Moreover, after the parameter of sound effect is configured, the volume output value may be regulated from the decreased second output value to the first output value step by step according to the volume increasing model to ensure smooth transition of the volume output value of the audio file during addition of the sound effect, improve the auditory comfort of the user and further improve a user experience.

Figure 3:
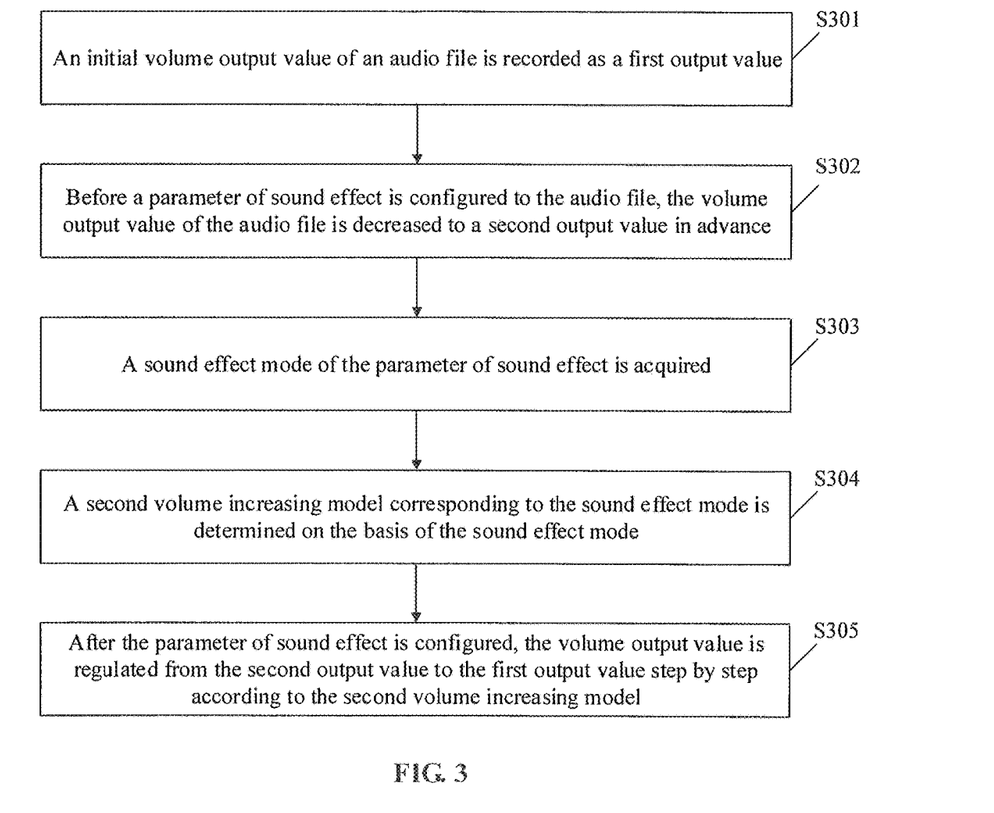
FIG. 3 is a flowchart of yet another method for processing volume according to an embodiment of the disclosure.

Referring to FIG. 3, FIG. 3 is a flowchart of another method for processing volume according to an embodiment of the disclosure. The method may be implemented by a user terminal described in the device embodiment. As shown in FIG. 3, the method may include the following operations.

In S301, an initial volume output value of an audio file is recorded as a first output value.

In an embodiment, when a sound effect is required to be configured to the audio file, the initial volume output value of the audio file may be recorded as the first output value. Specifically, when the audio file, to which the sound effect is required to be configured, of the user terminal is opened or the audio file is presently played in the user terminal, after an operation of adding the sound effect to the audio file is detected, the initial volume output value of the audio file may be recorded, and the initial volume output value of the audio file is taken as the first output value.

In S302, before a parameter of sound effect is configured to the audio file, the volume output value of the audio file is decreased to a second output value in advance.

In an embodiment, before the parameter of sound effect is configured to the audio file, the volume output value of the audio file may be decreased to the second output value in advance. Specifically, before the parameter of sound effect is required to be configured to the audio file, the volume output value of the audio file may be decreased in advance to avoid influence of an excessively high volume output value caused by addition of the sound effect on auditory comfort of a user. Here, the volume output value of the audio file is decreased to the second output value. The second output value may be a minimum output value. For example, the minimum output value is 0. Alternatively, the second output value may be determined on the basis of a preset volume increasing model. Alternatively, the second output value may be determined on the basis of a sound effect intensity of the parameter of sound effect presently required to be configured. When the sound effect intensity of the parameter of sound effect required to be configured is high, the second output value is relatively small. When the sound effect intensity of the parameter of sound effect required to be configured is low, the second output value is relatively large. Alternatively, the second output value may be determined on the basis of a preset noise threshold value. After the noise threshold value of the volume output value is preset, the second output value may be determined to be any value smaller than the noise threshold value. Optionally, the noise threshold value may be determined according to an audio type of the audio file or a volume the user is used to. When the audio type is a rock and roll type, the noise threshold value may be preset to be relatively large. When the audio type is a soft music type, the noise threshold value may be preset to be relatively small. Alternatively, when the user is used to a relatively high volume, the noise threshold value may be preset to be relatively large. When the user is used to a relatively low volume, the noise threshold value may be preset to be relatively small.

In S303, a sound effect mode of the parameter of sound effect is acquired.

In an embodiment, after the parameter of sound effect to be configured is acquired, the sound effect mode of the parameter of sound effect may be acquired. Specifically, the sound effect mode of the parameter of sound effect may be determined according to a change degree of the parameter of sound effect. When the parameter of sound effect is dramatically changed, the sound effect mode of the parameter of sound effect is a dramatic mode. When the parameter of sound effect is gently changed, the sound effect mode of the parameter of sound effect is a gentle mode. Alternatively, the sound effect mode of the parameter of sound effect may also be determined in combination with the audio file. When a file type of the audio file is a rock and roll type and the like, the sound effect mode of the configured parameter of sound effect is determined to be the dramatic mode. When the file type of the audio file is a soft music type and the like, the sound effect mode of the configured parameter of sound effect is determined to be the gentle mode and the like.

In S304, a second volume increasing model corresponding to the sound effect mode is determined on the basis of the sound effect mode.

In an embodiment, after the sound effect mode of the parameter of sound effect is acquired, the second volume increasing model corresponding to the sound effect mode may further be determined. Specifically, when the sound effect mode of the parameter of sound effect is the gentle mode, the corresponding second volume increasing model may be a logarithmic increasing model. When the sound effect mode of the parameter of sound effect is determined to be the dramatic mode, the corresponding second volume increasing model may be an exponential increasing model. When the sound effect mode is the gentle mode, the volume output value may be matched with the sound effect mode, and the volume output value is gently increased for output. That is, an increasing of the volume output value within a preset time compensation of a sound effect addition duration may be relatively small. In such a case, volume output is performed according to a universal logarithmic increasing model. The logarithmic increase mode may meet gentle increasing of the volume output value. When the sound effect mode is the dramatic mode, the volume output value may be matched with the sound effect mode, and the volume output value may be greatly increased. That is, the increasing of the volume output value within the preset time compensation of the sound effect addition duration is relatively large. In such a case, volume output may be performed according to a universal exponential increasing model, and the exponential increasing model may meet great increasing of the volume output value.

In S305, after the parameter of sound effect is configured, the volume output value is regulated from the second output value to the first output value step by step according to the second volume increasing model.

In an embodiment, the volume output value may be regulated through the determined second volume increase mode to be increased from the second output value to the initial volume output value, i.e., the first output value, of the audio file. The second volume increasing model corresponding to the sound effect mode may be determined through the sound effect mode corresponding to the parameter of sound effect, so that the volume output value may further be matched with the sound effect mode to enhance an output effect of the audio file at the same time of avoiding noise output.

In the embodiment of the disclosure, the initial volume output value of the audio file is recorded. When the parameter of sound effect is configured to the audio file, the volume output value of the audio file is decreased in advance. In such a way, influence of an excessively high volume output value caused by addition of the sound effect on the auditory comfort of the user is avoided. Moreover, after the parameter of sound effect is configured, the volume output value may be regulated from the decreased second output value to the first output value step by step according to the volume increasing model to ensure smooth transition of the volume output value of the audio file during addition of the sound effect, improve the auditory comfort of the user and further improve a user experience.

The device embodiment of the disclosure will be described below. The device embodiment of the disclosure is used for executing the method implemented by the method embodiment of the disclosure.

Figure 4:
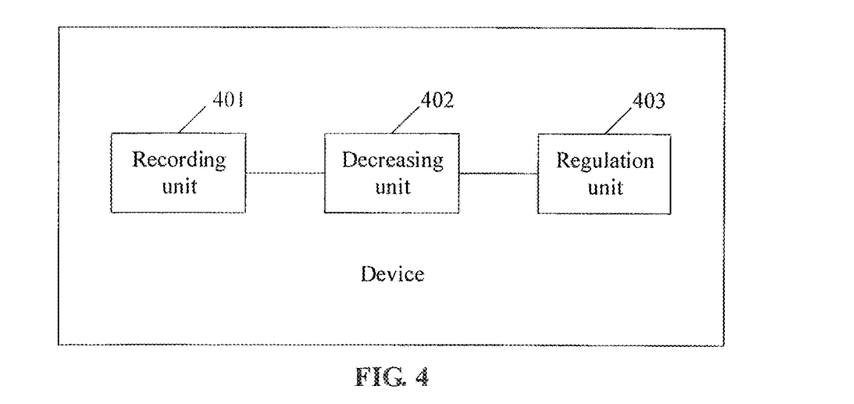
FIG. 4 is a block diagram illustrating configuration of units of a device for processing volume according to an embodiment of the disclosure.

Referring to FIG. 4, FIG. 4 is a block diagram illustrating configuration of units of a device for processing volume according to an embodiment of the disclosure. As shown in FIG. 4, the device may include a recording unit 401, a decreasing unit 402 and a regulation unit 403.

The recording unit 401 is configured to record an initial volume output value of an audio file as a first output value.

The decreasing unit 402 is configured to, before a parameter of sound effect is configured to the audio file, decrease the volume output value of the audio file to a second output value in advance.

The regulation unit 403 is configured to, after the parameter of sound effect is configured, regulate the volume output value from the second output value to the first output value step by step according to a volume increasing model.

Here, for specific functions realized by the recording unit 401, the decreasing unit 402 and the regulation unit 403, reference is made to specific descriptions about the related operations in the embodiment shown in FIG. 1.

In the embodiment of the disclosure, the initial volume output value of the audio file is recorded, and before the parameter of sound effect is configured to the audio file, the volume output value of the audio file is decreased in advance, so that influence of an excessively high volume output value caused by addition of the sound effect on the auditory comfort of the user is avoided. Moreover, after the parameter of sound effect is configured, the volume output value may be regulated from the decreased second output value to the first output value step by step according to the volume increasing model to ensure smooth transition of the volume output value of the audio file during addition of the sound effect, improve the auditory comfort of the user and further improve a user experience.

Figure 5:
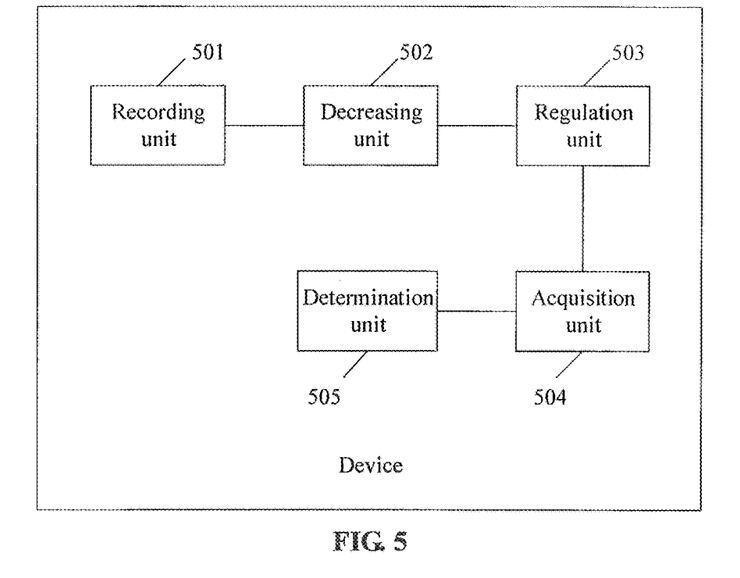
FIG. 5 is a block diagram illustrating configuration of units of another device for processing volume according to an embodiment of the disclosure.

Referring to FIG. 5, FIG. 5 is a block diagram illustrating configuration of units of another device for processing volume according to an embodiment of the disclosure. As shown in FIG. 5, this user terminal may include a recording unit 501, a decreasing unit 502, an acquisition unit 503, a determination unit 504 and a regulation unit 505.

Here, specific functions realized by the recording unit 501, the decreasing unit 502 and the regulation unit 505 refer to specific descriptions about the related operations in the embodiments shown in FIG. 2-FIG. 3.

In an embodiment, the acquisition unit 503 is configured to acquire a sound effect intensity of the parameter of sound effect.

The determination unit 504 is configured to determine a first volume increasing model corresponding to the sound effect intensity on the basis of the sound effect intensity.

Optionally, the determination unit 504 is configured to: acquire N sound effect intensities corresponding to N preset periodic moments during acting of the parameter of sound effect on the audio file. Here, N is an integer.

The determination unit 504 is configured to determine N corresponding volume increments on the basis of the N sound effect intensities.

The determination unit 504 is configured to determine the first volume increasing model on the basis of the N volume increments.

In another embodiment, the acquisition unit 503 is configured to acquire a sound effect mode of the parameter of sound effect.

The determination unit 504 is configured to determine a second volume increasing model corresponding to the sound effect mode on the basis of the sound effect mode.

Optionally, the determination unit 504 is configured to, if the sound effect mode is a gentle mode, determine a logarithmic increasing model as the second volume increasing model.

When the sound effect mode is a dramatic mode, determine an exponential increasing mode as the second volume increase mode.

In the embodiment, specific functions realized by the acquisition unit 503 and the determination unit 504 refer to specific descriptions about the related operations in the embodiments shown in FIG. 2-FIG. 3.

It is to be noted that the device for processing volume described in the device embodiment of the disclosure is presented in form of functional unit. Term "unit" used herein should be understood as a meaning which is as broad as possible and an object configured to realize a described function of each "unit" may be, for example, an Application Specific Integrated Circuit (ASIC), a single circuit, a processor (shared, dedicated or chip unit) and memory configured to execute one or more software or firmware programs, a combined logical circuit and/or another proper component realizing the function.

In the embodiment of the disclosure, the initial volume output value of the audio file is recorded, and before the parameter of sound effect is configured to the audio file, the volume output value of the audio file is decreased in advance, so that influence of an excessively high volume output value caused by addition of the sound effect on the auditory comfort of the user is avoided. Moreover, after the parameter of sound effect is configured, the volume output value may be regulated from the decreased second output value to the first output value step by step according to the volume increasing model to ensure smooth transition of the volume output value of the audio file during addition of the sound effect, improve the auditory comfort of the user and further improve a user experience.

Figure 6:
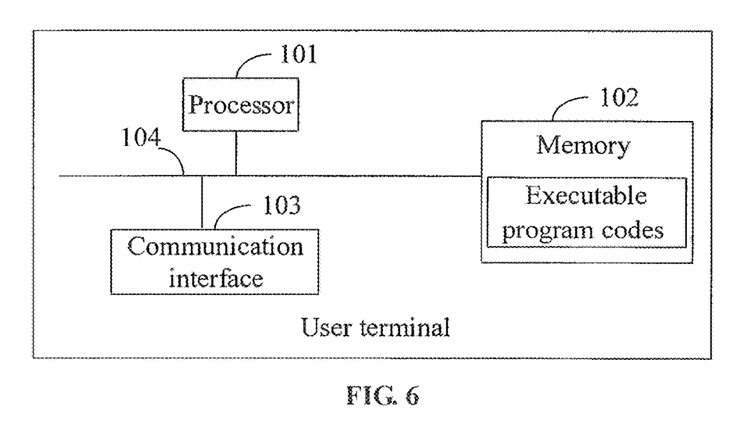
FIG. 6 is a structure diagram of a user terminal according to an embodiment of the disclosure.

An embodiment of the disclosure further provides a user terminal, which, as shown in FIG. 6, includes: a processor 101, a memory 102, a communication interface 103 and a communication bus 104. Here, the processor 101, the memory 102 and the communication interface 103 are connected through the communication bus 104 and complete mutual communication. The processor 101 controls wireless communication with an external cellular network through the communication interface 103. The communication interface 103 includes, but not limited to, an antenna, an amplifier, a transceiver, a coupler, a Low Noise Amplifier (LNA), a duplexer and the like. The memory 102 includes at least one of: a Random Access Memory (RAM), a non-volatile memory or an external memory. Executable program codes are stored in the memory 102. The executable program codes may guide the processor 101 to execute a method specifically disclosed in the method embodiment of the disclosure, including the following operations that:

the processor 101 records an initial volume output value of an audio file as a first output value;

before a parameter of sound effect is configured to the audio file, the processor 101 decreases the volume output value of the audio file to a second output value in advance; and after the parameter of sound effect is configured, the processor 101 regulates the volume output value from the second output value to the first output value step by step according to a volume increasing model.

In the embodiment of the disclosure, the initial volume output value of the audio file is recorded, and before the parameter of sound effect is configured to the audio file, the volume output value of the audio file is decreased in advance, so that influence of an excessively high volume output value caused by addition of the sound effect on the auditory comfort of the user is avoided. Moreover, after the parameter of sound effect is configured, the volume output value may be regulated from the decreased second output value to the first output value step by step according to the volume increasing model to ensure smooth transition of the volume output value of the audio file during addition of the sound effect, improve the auditory comfort of the user and further improve a user experience.

In addition, the executable program code stored in the memory 102 is further configured to execute the related operations of the methods shown in FIG. 2-3. No elaborations will be made herein.

Figure 7:
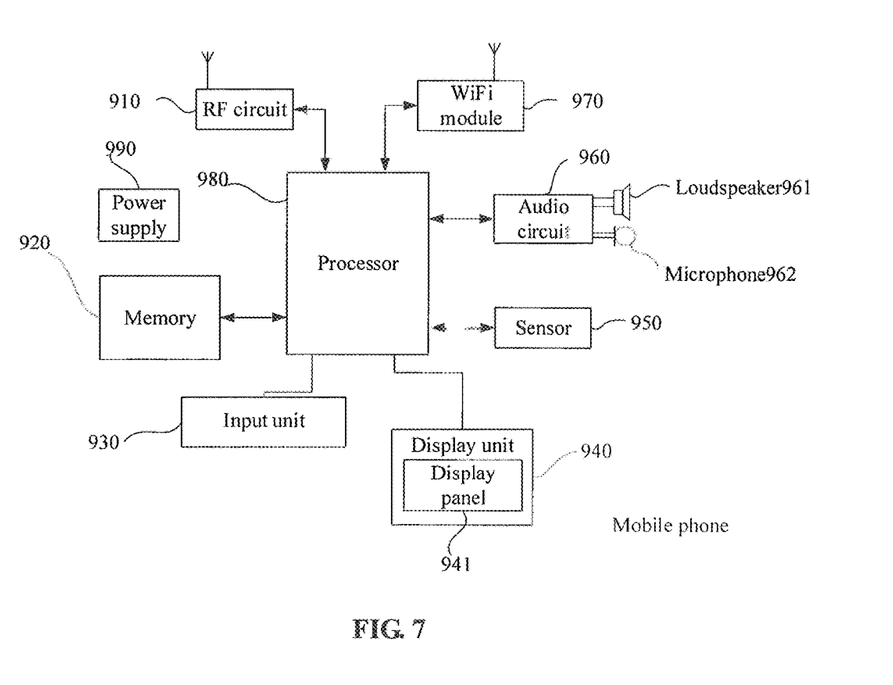
FIG. 7 is a structure diagram of another user terminal according to an embodiment of the disclosure.

An embodiment of the disclosure further provides another user terminal. As shown in FIG. 7, for convenient description, only parts related to the embodiment of the disclosure are shown, and specific technical details which are undisclosed refer to parts of the method of the embodiments of the disclosure. The mobile terminal may be any piece of terminal equipment including a mobile phone, a tablet computer, a Personal Digital Assistant (PDA), a Point of Sales (POS), a vehicle-mounted computer and the like. For example, the user terminal is a mobile phone.

FIG. 7 is a block diagram of part of a structure of a mobile phone related to a user terminal according to an embodiment of the disclosure. Referring to FIG. 7, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 7 is not intended to limit the mobile phone and may include components more or fewer than those shown in the figure or some components are combined or different component arrangements are adopted.

Each component of the mobile phone will be specifically introduced below in combination with FIG. 7.

The RF circuit 910 may be configured to receive and send information. The RF circuit 910 usually includes, but not limited to, an antenna, at least one amplifier, a transceiver, a coupler, an LNA, a duplexer and the like. In addition, the RF circuit 910 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 920 may be configured to store a software program and a module, and the processor 980 operates the software program and module stored in the memory 920, thereby executing various function applications and data processing of the mobile phone. The memory 920 may mainly include a program storage region and a data storage region, wherein the program storage region may store an operating system, an application program required by at least one function and the like, and the data storage region may store data created according to use of the mobile phone and the like. In addition, the memory 920 may include a high-speed RAM, and may further include a non-volatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include one or more of a physical keyboard, a function key (for example, a volume control key and an on-off key), a trackball, a mouse, a joystick, a fingerprint recognition module and the like.

The display unit 940 may be configured to display information input by the user or information provided for the user and various menus of the mobile phone. The display unit 940 may include a display screen 941. Optionally, the display screen 941 may be configured in form of a Liquid Crystal Display (LCD), an Organic Light-Emitting Diode (OLED) and the like.

The mobile phone may further include at least one sensor 950, for example, a light sensor, a motion sensor and another sensor. Specifically, the light sensor may include an environmental light sensor and a proximity sensor, wherein the environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960, a loudspeaker 961 and a microphone 962 may provide an audio interface between the user and the mobile phone. The audio circuit 960 may transmit an electric signal converted from received audio data to the loudspeaker 961, and then the loudspeaker 961 converts it into a sound signal for output. On the other aspect, the microphone 962 converts a collected sound signal into an electric signal, and then the audio circuit 960 receives and converts it into audio data and outputs the audio data to the processor 980 for processing and sending to, for example, another mobile phone through the RF circuit 910 or outputs the audio data to the memory 920 for further processing.

WiFi is a short-distance wireless communication technology. The mobile phone may help the user to receive and send an electronic mail, browse a webpage, access streaming media and the like through the WiFi module 970, and provides wireless broadband Internet access for the user. Although the WiFi module 970 is shown in FIG. 7, it can be understood that it is not a necessary component of the mobile phone and may completely be omitted according to a requirement without changing the scope of the essence of the disclosure.

The processor 980 is a control center of the mobile phone, connects each part of the whole mobile phone by virtue of various interfaces and lines and executes various functions and data processing of the mobile phone by operating or executing the software program and/or module stored in the memory 920 and calling data stored in the memory 920, thereby monitoring the whole mobile phone. Optionally, the processor 980 may include one or more core processing units. Preferably, the processor 980 may integrate an application processor and a modulation and demodulation processor, wherein the application processor mainly processes the operating system, a user interface, an application program and the like, and the modulation and demodulation processor mainly processes wireless communication. It can be understood that the modulation and demodulation processor may also not be integrated into the processor 980.

The mobile phone further includes the power supply 990 (for example, a battery) supplying power to each component. Preferably, the power supply may be logically connected with the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In any embodiment in the embodiments shown in FIG. 1-FIG. 3, each step of the method flows may be implemented on the basis of the structure of the mobile phone.

In any embodiment in the embodiments shown in FIG. 4-FIG. 5, the function of each unit may be realized on the basis of the structure of the mobile phone.

An embodiment of the disclosure further provides a computer storage medium, wherein the computer storage medium may store a program, and when the program is executed, part or all of the operations of any method for processing volume recorded in the method embodiment are included.

It is to be noted that, for simple description, each method embodiment is expressed into a combination of a series of actions. However, those skilled in the art should know that the disclosure is not limited by an action sequence described herein because some operations may be executed in another sequence or at the same time according to the disclosure. Second, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the operations of the method in each embodiment of the disclosure. The memory includes: various media capable of storing program codes such as a U disk, a Read-Only Memory (ROM), a RAM, a mobile hard disk, a magnetic disk or an optical disk.

Those of ordinary skilled in the art can understand that all or part of the operations in various methods of the embodiments may be completed by related hardware instructed by a program, the program may be stored in a computer-readable memory, and the memory may include a flash disk, a ROM, a RAM, a magnetic disk, an optical disk or the like.

The embodiments of the application are introduced above in detail, the principle and implementation modes of the disclosure are elaborated with specific examples in the disclosure, and the descriptions made to the embodiments are only adopted to help the method of the disclosure and the core concept thereof to be understood. In addition, those of ordinary skilled in the art may make variations to the specific implementation modes and the application scope according to the concept of the disclosure. From the above, the contents of the specification should not be understood as limits to the disclosure.

The invention claimed is:

1. A method for processing volume, comprising:
   recording an initial volume output value of an audio file as a first output value;
   before a parameter of sound effect is configured to the audio file, decreasing a volume output value of the audio file to a second output value in advance; and
   after the parameter of sound effect is configured, regulating the volume output value from the second output value to the first output value step by step according to a volume increasing model;
   wherein before regulating the volume output value from the second output value to the first output value step by step according to the volume increasing model, the method further comprises:
   acquiring a sound effect intensity of the parameter of sound effect; and
   determining a first volume increasing model corresponding to the sound effect intensity on the basis of the sound effect intensity, wherein
   regulating the volume output value from the second output value to the first output value step by step according to the volume increasing model comprises:
   regulating the volume output value from the second output value to the first output value step by step according to the first volume increasing model;
   or, wherein before regulating the volume output value from the second output value to the first output value step by step according to the volume increasing model, the method further comprises:
   acquiring a sound effect mode of the parameter of sound effect, and
   determining a second volume increasing model corresponding to the sound effect mode on the basis of the sound effect mode, wherein
   regulating the volume output value from the second output value to the first output value step by step according to the volume increasing model comprises:
   regulating the volume output value from the second output value to the first output value step by step according to the second volume increasing model.

2. The method of claim 1, wherein determining the first volume increasing model corresponding to the sound effect intensity on the basis of the sound effect intensity comprises:
   acquiring N sound effect intensities corresponding to N preset periodic moments during acting of the parameter of sound effect on the audio file, N being an integer;
   determining N corresponding volume increments on the basis of the N sound effect intensities; and
   determining the first volume increasing model on the basis of the N volume increments.

3. The method of claim 2, wherein acquiring the N sound effect intensities corresponding to the N preset periodic moments during the acting of the parameter of sound effect on the audio file comprises:
   determining a parameter of sound effect curve corresponding to the time period during which the parameter of sound effect is configured;
   acquiring N parameter of sound effects corresponding to the N preset periodic moments from the parameter of sound effect curve; and
   determining the N sound effect intensities corresponding to the N parameter of sound effects.

4. The method of claim 2, wherein acquiring the N sound effect intensities corresponding to the N preset periodic moments during the acting of the parameter of sound effect on the audio file comprises:
   acquiring a sound effect intensity curve of sound effect intensities relative to the addition duration; and
   acquiring the N sound effect intensities corresponding to the N preset periodic moments from the sound effect intensity curve.

5. The method of claim 1, wherein determining the second volume increasing model corresponding to the sound effect mode on the basis of the sound effect mode comprises:
   when the sound effect mode is a gentle mode, determining a logarithmic increasing model as the second volume increasing model; and
   when the sound effect mode is a dramatic mode, determining an exponential increasing mode as the second volume increase mode.

6. The method of claim 1, wherein the second output value is determined on the basis of a noise threshold value.

7. The method of claim 6, wherein the noise threshold value is determined at least partially on the basis of an audio type of the audio file or a volume output value that a user is used to.

8. A sound effect processing device, comprising:
   a memory storing executable program codes;
   at least one processor is configured to call the executable program codes in the memory to execute operations of:
   recording an initial volume output value of an audio file as a first output value;
   before a parameter of sound effect is configured to the audio file, decreasing the volume output value of the audio file to a second output value in advance; and
   after the parameter of sound effect is configured, regulating the volume output value from the second output value to the first output value step by step according to a volume increasing model;
   wherein the at least one processor is further configured to call the executable program codes in the memory to execute operations of:
   acquiring a sound effect intensity of the parameter of sound effect, and
   determining a first volume increasing model corresponding to the sound effect intensity on the basis of the sound effect intensity, wherein
   the volume output value is regulated from the second output value to the first output value step by step according to the first volume increasing model;
   or, wherein the at least one processor is further configured to call the executable program codes in the memory to execute operations of:
   acquiring a sound effect mode of the parameter of sound effect, and
   determining a second volume increasing model corresponding to the sound effect mode on the basis of the sound effect mode, wherein
   the volume output value is regulated from the second output value to the first output value step by step according to the second volume increasing model.

9. The device of claim 8, wherein the at least one processor is configured to call the executable program codes in the memory to execute operations of:
   acquiring N sound effect intensities corresponding to N preset periodic moments during acting of the parameter of sound effect on the audio file, N being an integer;
   determining N corresponding volume increments on the basis of the N sound effect intensities; and
   determining the first volume increasing model on the basis of the N volume increments.

10. The device of claim 9, wherein the at least one processor is configured to call the executable program codes in the memory to execute operations of:
- determining a parameter of sound effect curve corresponding to the time period during which the parameter of sound effect is configured;
- acquiring N parameter of sound effects corresponding to the N preset periodic moments from the parameter of sound effect curve; and
- determining the N sound effect intensities corresponding to the N parameter of sound effects.

11. The device of claim 9, wherein the at least one processor is configured to call the executable program codes in the memory to execute operations of:
- acquiring a sound effect intensity curve of sound effect intensities relative to the addition duration; and
- acquiring the N sound effect intensities corresponding to the N preset periodic moments from the sound effect intensity curve.

12. The device of claim 8, wherein the at least one processor is configured to call the executable program codes in the memory to execute operations of:
- when the sound effect mode is a gentle mode, determining a logarithmic increasing model as the second volume increasing model; and
- when the sound effect mode is a dramatic mode, determining an exponential increasing mode as the second volume increase mode.

13. The device of claim 8, wherein the second output value is determined on the basis of a noise threshold value.

14. The device of claim 13, wherein the noise threshold value is determined at least partially on the basis of an audio type of the audio file or a volume output value that a user is used to.

15. A non-transitory computer-readable storage medium having stored thereon instructions that when being executed by a computer, cause the computer to perform a method for processing volume, the method comprising:
- recording an initial volume output value of an audio file as a first output value;
- before a parameter of sound effect is configured to the audio file, decreasing a volume output value of the audio file to a second output value in advance; and
- after the parameter of sound effect is configured, regulating the volume output value from the second output value to the first output value step by step according to a volume increasing model;

wherein before regulating the volume output value from the second output value to the first output value step by step according to the volume increasing model, the method further comprises:
- acquiring a sound effect intensity of the parameter of sound effect; and
- determining a first volume increasing model corresponding to the sound effect intensity on the basis of the sound effect intensity, wherein regulating the volume output value from the second output value to the first output value step by step according to the volume increasing model comprises:
regulating the volume output value from the second output value to the first output value step by step according to the first volume increasing model;

or, wherein before regulating the volume output value from the second output value to the first output value step by step according to the volume increasing model, the method further comprises:
- acquiring a sound effect mode of the parameter of sound effect, and
- determining a second volume increasing model corresponding to the sound effect mode on the basis of the sound effect mode, wherein regulating the volume output value from the second output value to the first output value step by step according to the volume increasing model comprises:
regulating the volume output value from the second output value to the first output value step by step according to the second volume increasing model.

* * * * *